United States Patent Office 2,798,851
Patented July 9, 1957

2,798,851
EMULSION DRILLING FLUID FOR WELLS

Murrell D. Nelson, Jr., Arlington, Tex., and Joseph U. Messenger, Calgary, Alberta, Canada, assignors, by mesne assignments, to Socony Mobil Oil Company, Inc., New York, N. Y., a corporation of New York No Drawing. Application April 8, 1955, Serial No. 500,290

13 Claims. (Cl. 252—8.5)

This invention relates to drilling fluids, and relates more particularly to an emulsion drilling fluid.

In the rotary drilling of wells, such as those for petroleum oil or gas, a drilling fluid is continuously circulated from the surface of the ground to the bottom of the well bore hole and back to the surface of the ground again. The drilling fluid has various functions including those of lubricating the drill bit and pipe, carrying cuttings from the bottom of the well bore hole to the surface of the ground, and imposing a hydrostatic head on the drilled formations to prevent escape of oil, gas, or water therefrom into the well bore hole during the drilling operations. Ordinarily, aqueous drilling fluids comprising a suspension of a clay in water are employed. Aqueous drilling fluids have a comparatively high specific gravity, and, where reduced specific gravities are required, drilling fluids having a liquid phase consisting entirely of oil or consisting of an emulsion of oil and water can be used.

Oil-in-water emulsion drilling fluids are less expensive and more convenient to handle than drilling fluids having a liquid phase consisting entirely of oil. Therefore, of these two types of drilling fluids, the oil-in-water emulsion drilling fluids are usually preferred. On the other hand, the oil-in-water emulsion drilling fluids, in common with aqueous drilling fluids, are recognized to damage oil-producing formations by reason of filtration of water from the fluid into the formations. As a result of filtration of water, the permeability of the formation is reduced with consequent reduction in the rate at which oil is produced. To avoid the damage to the formation arising from the use of aqueous and oil-in-water emulsion drilling fluids, and yet retain the advantages of the emulsion fluids and those whose liquid phase consists entirely of oil, the use of water-in-oil emulsion drilling fluids has been proposed. However, water-in-oil emulsion drilling fluids have heretofore required the use of emulsifying agents which often are not readily available in areas where drilling is effected or are undesirably expensive.

It is an object of this invention to provide water-in-oil emulsion. It is another object of this invention to provide a drilling fluid. It is another object of this invention to increase the availability of water-in-oil emulsion drilling fluid. It is another object of this invention to reduce the cost of water-in-oil emulsion drilling fluid. It is another object of this invention to provide a fluid for use in completing a well in an oil-producing earth formation. It is another object of this invention to provide a method for preparing a water-in-oil emulsion drilling fluid. These and other objects of the invention will become apparent from the following detailed description.

In accordance with the invention, a reaction mixture is formed of sulfuric acid and petroleum oil and the reaction mixture is treated by the addition of a material to convert reaction product of the sulfuric acid and petroleum oil to a water-insoluble salt and by the addition of water, whereby a water-in-oil emulsion is formed.

We have found that a water-in-oil emulsion prepared by the procedure described above is effective for use in operations for the recovery of petroleum oil from subterranean formations. The materials employed in the preparation of the emulsion are readily available and relatively inexpensive. Thus, a water-in-oil emulsion for use in recovery of petroleum oil from subterranean formations can be prepared without the necessity for using relatively expensive materials that may not be readily available.

The water-in-oil emulsion can be employed for the treatment of an oil-producing formation. However, the emulsion has specific and preferred use in a well bore hole during mechanical penetration of an oil-producing formation. In a more restricted sense, the emulsion is preferably employed as a drilling fluid. In another sense, the emulsion can be employed as a completion fluid.

The petroleum oil employed to form the reaction mixture with the sulfuric acid may be any type of petroleum oil containing an unsaturated component. By unsaturated component is meant any hydrocarbon containing carbon atoms having an unsatisfied valence. These unsaturated components may be either cyclic or acyclic. The petroleum oil preferably should contain unsaturated components in such amount that reaction product of the sulfuric acid and petroleum oil will constitute more than about five percent by weight of the reaction mixture. The petroleum oil can be a crude petroleum oil or can be a refined petroleum oil. The refined petroleum oil may be a residue from a refining operation or any fraction having an origin in crude petroleum oil. Preferably, the petroleum oil is a crude petroleum oil.

The sulfuric acid is preferably in the form generally known as concentrated sulfuric acid. Concentrated sulfuric acid of commerce is a water-solution of hydrogen sulfate and the concentration of the hydrogen sulfate may be expressed in terms of sulfur trioxide content. However, concentration is generally expressed on the basis of the relative weight of the acid solution which may be in terms of density, specific gravity, or degrees Baumé. Any of the commercial concentrated acids may be employed. Effective results have been obtained where the density of the acid was above 1.5. The form of sulfuric acid known as oleum, or fuming sulfuric acid, may also be employed but the use of such acid is not required.

The proportion of sulfuric acid to petroleum oil employed in the preparation of the reaction mixture may vary. The amount of sulfuric acid will ordinarily be less than the amount of petroleum oil and this amount for any petroleum oil will depend upon the concentration of the sulfuric acid employed. Satisfactory results have been obtained employing one to ten volumes of sulfuric acid for each 500 volumes of petroleum oil where the sulfuric acid had a density of 66° Baumé. However, less than one and more than ten volumes of sulfuric acid per 500 volumes of petroleum oil can be employed. However, the amount should be sufficient to provide in the reaction mixture the amount of reaction product of the sulfuric acid and petroleum oil indicated above.

Following preparation, the reaction mixture is treated by the addition of a material to convert reaction product of the sulfuric acid and petroleum oil to a water-insoluble salt and by the addition of water.

It is preferred to delay this treatment for some time after preparation of the reaction mixture. By delay, time is permitted for optimum formation of reaction product. This time may vary and will depend upon such factors as temperature, concentration of sulfuric acid, and the proportion of sulfuric acid to petroleum oil. With decreasing temperature, a greater time should be allowed for the formation of reaction product. The temperature of the reaction mixture may be atmospheric temperature and satisfactory results have been obtained with temperatures below 32° F. and with temperatures above 75° F. Artificial heating of the reaction mixture may be employed if desired. With increasing concentration and proportion of sulfuric acid, a shorter time may be allowed for the formation of reaction product. Satisfactory results have been obtained with times for the formation of reaction product of about 24 hours at temperatures of the order of 32° F. where the acid had a density of 66° Baumé and the proportion of sulfuric acid to petroleum oil by volume was about 2.5 to 500. At temperatures of the order of 75° F., satisfactory results have been obtained with times of about 10 minutes under the same conditions of concentration and proportion of sulfuric acid.

The reaction product of the sulfuric acid and petroleum oil is a sulfuric acid derivative of the petroleum oil and is capable of ionizing in aqueous solution to provide hydrogen ion. The material employed for conversion of the reaction product should be a material capable of providing a cation to replace this hydrogen ion and form a water-insoluble salt of the reaction product. These cations to replace the hydrogen ion may be calcium, barium, or strontium ions. They may also be iron, aluminum, zinc, or cadmium ions. Of these, calcium ion is to be preferred. The material providing the cation to replace the hydrogen ion may be the metallic element per se and the metallic element may be added to the reaction mixture. However, it is preferred that the material be a salt or the base of the element. In the case of calcium, it is preferred that the material be calcium chloride. However, lime is satisfactory. The material, if soluble in water, may be added to the reaction mixture in the form of an aqueous solution.

The conversion of reaction product of the sulfuric acid and petroleum oil to a water-insoluble salt ordinarily will occur rapidly. However, where extremely low temperatures are encountered, sufficient time should be permitted to elapse in order to insure that the conversion reaction be substantially complete. A time of two hours will usually be the maximum and, with increase in temperature of the reaction mixture, the time may be shortened.

The amount of material to convert reaction product of sulfuric acid and petroleum oil to a water-insoluble salt should be sufficient to react with the entire amount of reaction product. The amount of reaction product in the reaction mixture will vary depending upon the proportion of sulfuric acid to petroleum oil, the type of petroleum oil, and the concentration of the acid employed. However, where the amount of reaction product is not readily ascertainable, a sufficient amount of the material to react with the entire amount of reaction product may be assured by employing an amount at least equal to the stoichiometric amount required to react with the entire amount of sulfuric acid which was employed in the preparation of the reaction mixture. This latter procedure is to be preferred where calcium is employed in view of the fact, as will be pointed out in greater detail hereinafter, that an excess amount of calcium can be of advantage. Satisfactory results have been obtained where 0.03 to 0.26 pound of calcium chloride per gallon of reaction mixture was employed, the reaction mixture having been prepared employing one to ten volumes of sulfuric acid having a density of 66° Baumé per 500 volumes of petroleum oil.

The reaction mixture is also treated by the addition of water. This may be carried out after conversion of the reaction product of the sulfuric acid and petroleum oil to the water-insoluble salt. The reaction product containing the converted reaction product and the water may be admixed together. The amount of water employed should be such that the oil phase of the resulting emulsion will constitute between about 20 and 85 percent by volume. However, the volume of oil with respect to the volume of water in the emulsion may vary depending upon the use to which the emulsion is to be put and the properties desired.

Where employed as a fluid for the drilling of wells, the emulsion may contain clay, weighting agent, or other materials commonly employed for various purposes in drilling fluids. The clay may be bentonite, montmorillonite, illite, kaolinite, attapulgite, or other type of conventional clay. Similarly, the weighting agents may be barites, iron oxide, lead oxide, oyster shells, or other conventional weighting agents. Where employed as a drilling fluid, the emulsion may be prepared by admixing a drilling fluid with the reaction mixture after conversion of the reaction product to water-insoluble salt. The drilling fluid may be an aqueous drilling fluid, such as a water-base drilling fluid or an oil-in-water emulsion drilling fluid. The drilling fluid may contain clay, weighting agent, or other material commonly employed in these drilling fluids. The amount of the drilling fluid employed for the preparation of the emulsion may be the same as where water is employed.

In connection with the use of clay in the water-in-oil emulsion, it has been found that superior results are obtained where the clay is in the form of its calcium salt. Thus, where the clay is originally in a form other than its calcium salt, it is preferred to convert the clay to the calcium salt form. This may be done by employing calcium salt, such as calcium chloride, with the clay. The conversion can be effected by admixing water, the clay, and the calcium salt with each other. Where a drilling fluid containing clay is employed for admixture with the reaction mixture to provide part or all of the water phase of the water-in-oil emulsion, the calcium salt may be added to the drilling fluid. However, as mentioned hereinabove, where calcium salt is used to convert reaction product of the sulfuric acid and petroleum oil to water-insoluble salt, an excess of calcium salt may be used and this excess can serve to provide part or all of the calcium ion for conversion of the clay to the calcium form.

Oil may be admixed with the reaction mixture along with the water, if desired. If oil is employed, this oil will serve to provide part of the oil phase of the water-in-oil emulsion. Further, where oil is admixed with the reaction mixture along with the water, it may be necessary to increase the amount or concentration of the sulfuric acid employed to form the reaction mixture. The additional oil admixed with the reaction mixture is preferably a petroleum oil and of the same type as employed in preparation of the reaction mixture. However, other oils including crude petroleum oil, diesel oil, fuel oil, gas oil, and the like may be used. Animal or vegetable oils may also be used.

The invention is of particular advantage for the preparation of water-in-oil emulsions in the field. The invention is also of particular advantage for the conversion to water-in-oil emulsion drilling fluid of an aqueous, oil, or oil-in-water emulsion drilling fluid. These latter drilling fluids may be employed in the drilling of a well until a particular formation, such as an oil-producing formation, is reached, which formation desirably is to be drilled with water-in-oil emulsion drilling fluid. In this case, petroleum oil and sulfuric acid may be admixed to form the reaction mixture and the reaction mixture treated by the addition of the material to convert reaction product to a water-insoluble salt and by the addition of the water-base drilling fluid. A similar procedure can be employed where an oil-in-water emulsion drilling fluid is to be converted to a water-in-oil emulsion drilling fluid, the reaction mixture being treated by addition of the oil-in-water emulsion drilling fluid. With this latter procedure, of course, the proper proportion of reaction mixture and oil-in-water emulsion would be employed to obtain the desired amount of water and oil in the water-in-oil emulsion. If required, water can be added. A drilling fluid whose liquid phase consists substantially entirely of oil can be converted to a water-in-oil emulsion drilling fluid by addition of sulfuric acid to the drilling fluid and treatment by addition of the material to convert the reaction product to a water-insoluble salt and by addition of water.

As stated, the water-in-oil emulsion can be employed for the treatment of an oil-producing formation. This may be effected, for example, by contact of the emulsion with the formation. The emulsion, however, as also stated, has preferred use as a fluid for the drilling of wells. The drilling fluid may be employed throughout the drilling of the well or may be employed only when drilling through a particular formation. This particular formation may be an oil-producing formation. The fluid may also be employed when perforating the formation or otherwise performing completion operations. The drilling fluid has also particular use during workover operations. In any of these uses, the fluid may contain such materials as previously described or as otherwise desired so long as they have no deleterious effect upon the emulsion.

The following examples will be illustrative of the invention.

*Example 1*

Two hundred and fifty volumes of crude petroleum oil were admixed with 1.3 volumes of sulfuric acid having a density of 66° Baumé. The reaction mixture was stirred and permitted to stand overnight at room temperature. Four volumes of calcium chloride solution containing about 5.4 pounds of calcium chloride per gallon of solution were added to the reaction mixture and the mixture was stirred. Thereafter, 55 volumes of water and 55 volumes of oil-in-water emulsion drilling fluid were added to the mixture. This oil-in-water emulsion drilling fluid added to the mixture contained oil, water, clay, quebracho, and emulsifying agent commercially sold for oil-in-water emulsion drilling fluids and the oil and water in this drilling fluid were in the volume ratio of about 1 to 9. A water-in-oil emulsion formed upon addition of the water and oil-in-water emulsion drilling fluid. Thereafter, to the water-in-oil emulsion were added another 55 volumes of the oil-in-water emulsion drilling fluid. The water-in-oil emulsion was aged for 16 hours at 70° C. and tested for stability and filter loss. The stability was high and the API filter loss was 0.1 cc. of oil in 24 hours. The emulsion had satisfactory properties for the drilling of wells.

*Example 2*

For the drilling of a well to a subterranean oil-containing formation, it was desired to employ water-in-oil emulsion drilling fluid. Crude petroleum oil produced from a well previously drilled to the same oil-containing formation was employed for the preparation of water-in-oil emulsion. Four hundred and twenty-three barrels of this oil were admixed with 88 gallons of commercial sulfuric acid having a density of 66° Baumé. The reaction mixture was permitted to stand at atmospheric temperature for one day. Thereafter, 175 barrels of this mixture were pumped to mud tanks located adjacent to the drilling rig and 600 pounds of calcium chloride dissolved in 110 gallons of water were added to the reaction mixture. Stirring was effected by pumping the mixture in the mud tanks through the mud guns. Two hours after addition of the calcium chloride solution, 100 barrels of drilling fluid and 15 barrels of water were added and stirring with the mud guns was continued. The drilling fluid added to the mixture in the amount of 100 barrels was an oil-in-water emulsion drilling fluid and contained oil, water, the volume ratio of the oil and water being about 1 to 9, native clay, quebracho, sodium hydroxide, and emulsifying agent commercially sold for use in oil-in-water emulsion drilling fluids. A water-in-oil emulsion formed and after mixing for two hours, the emulsion was pumped into the well bore hole for drilling of the well. One hundred and seventy-five barrels more of the reaction mixture of the petroleum oil and sulfuric acid were pumped to the mud tanks. Six hundred pounds of calcium chloride dissolved in 165 gallons of water were added to the tanks and stirring was effected by means of the mud guns. One hundred barrels of the oil-in-water emulsion drilling fluid and 12 barrels of water were then added and stirring was continued. Thereafter, there was added to the mud tanks 40 more barrels of the reaction mixture of the petroleum oil and sulfuric acid and 200 pounds of calcium chloride dissolved in 55 gallons of water. Following continued stirring, the water-in-oil emulsion was pumped to the well bore hole and added to the previous fluid passed thereto for drilling of the well. This fluid performed satisfactorily during drilling of the well.

Having thus described our invention, it will be understood that such description has been given by way of illustration and example and not by way of limitation, reference for the latter purpose being had to the appended claims.

We claim:

1. In an operation in a well bore hole penetrating an earth formation wherein a water-in-oil emulsion is pumped into said well bore hole from the surface of the earth to contact said earth formation, the steps comprising admixing sulfuric acid and petroleum oil to form a reaction mixture, maintaining said reaction mixture under reaction conditions of temperature for such time as to permit formation of reaction product of said sulfuric acid and said petroleum oil, thereafter adding to said reaction mixture a material to convert reaction product of said sulfuric acid and said petroleum oil to a water-insoluble salt thereof, said material being selected from the group consisting of polyvalent metals and their bases and salts, thereafter adding water to said reaction mixture whereby a water-in-oil emulsion is formed, the amount of said water added to said reaction mixture being such that the oil in said water-in-oil emulsion will constitute between 20 and 85 percent by volume, and pumping said water-in-oil emulsion into said well bore hole from the surface of the earth to contact said earth formation.

2. The process of claim 1 wherein said sulfuric acid has a density in excess of 1.5.

3. The process of claim 1 wherein said sulfuric acid and said petroleum oil are admixed in a volume ratio of between one and ten to 500.

4. The process of claim 1 wherein said material to convert reaction product of said sulfuric acid and said petroleum oil is a material selected from the class consisting of calcium, barium, strontium, iron, aluminum, zinc, and cadmium.

5. The process of claim 1 wherein said material to convert reaction product of said sulfuric acid and said petroleum oil is a material selected from the class consisting of the salts and bases of calcium, barium, strontium, iron, aluminum, zinc and cadmium.

6. The process of claim 4 wherein said material is added to said reaction mixture in amount at least equal to the stoichiometric amount required for reaction with said sulfuric acid employed to form said reaction mixture.

7. The process of claim 5 wherein said material is a compound selected from the salts and the base of calcium.

8. The process of claim 4 wherein said material is calcium chloride.

9. The process of claim 1 wherein said petroleum oil is a crude petroleum oil.

10. The process of claim 1 wherein said petroleum oil is a fraction of a refined petroleum oil.

11. In an operation in a well bore hole penetrating an earth formation wherein a water-in-oil emulsion is pumped into said well bore hole from the surface of the earth to contact said earth formation, the steps comprising admixing sulfuric acid and petroleum oil to form a reaction mixture, maintaining said reaction mixture under reaction conditions of temperature for such time as to permit formation of reaction product of said sulfuric acid and said petroleum oil, thereafter adding to said reaction mixture a material to convert reaction product of said sulfuric acid and said petroleum oil to a water-insoluble salt thereof, said materials being selected from the group consisting of polyvalent metals and their bases and salts, thereafter adding water to said reaction mixture whereby a water-in-oil emulsion is formed, the amount of said water added to said reaction mixture being such that the oil in said water-in-oil emulsion will constitute between 20 and 85 percent by volume, adding clay to said water-in-oil emulsion, and pumping said water-in-oil emulsion containing said clay into said well bore hole from the surface of the earth to contact said formation.

12. The process of claim 11 wherein said clay is in the form of its calcium salt.

13. In an operation in a well bore hole penetrating an earth formation wherein a water-in-oil emulsion is pumped into said well bore hole from the surface of the earth to contact said earth formation, the steps comprising admixing sulfuric acid and petroleum oil to form a reaction mixture, maintaining said reaction mixture under reaction conditions of temperature for such time as to permit formation of reaction product of said sulfuric acid and said petroleum oil, thereafter adding to said reaction mixture a material to convert reaction product of said sulfuric acid and said petroleum oil to a water-insoluble salt thereof, said material being selected from the group consisting of polyvalent metals and their bases and salts, thereafter adding water to said reaction mixture whereby a water-in-oil emulsion is formed, the amount of said water added to said reaction mixture being such that the oil in said water-in-oil emulsion will constitute between 20 and 85 percent by volume, thereafter adding to said water-in-oil emulsion a drilling fluid containing water, and pumping the resulting mixture from the surface of the earth through said well bore hole to contact said earth formation.

References Cited in the file of this patent
UNITED STATES PATENTS

| | | |
|---|---|---|
| 2,360,992 | Weiss | Oct. 24, 1944 |
| 2,361,476 | Higbee et al. | Oct. 31, 1944 |
| 2,402,325 | Griesinger et al. | June 18, 1946 |
| 2,453,690 | Bray | Nov. 16, 1948 |
| 2,532,997 | Cohen | Dec. 5, 1950 |
| 2,542,019 | Fischer | Feb. 20, 1951 |
| 2,713,035 | Clarke | July 12, 1955 |